(12) United States Patent
Urdang et al.

(10) Patent No.: US 8,266,659 B2
(45) Date of Patent: Sep. 11, 2012

(54) TECHNIQUE FOR COLLECTING DATA RELATING TO ACTIVITY OF A USER RECEIVING ENTERTAINMENT PROGRAMS THROUGH A COMMUNICATIONS NETWORK

(75) Inventors: Erik G. Urdang, Boulder, CO (US); David G. Bell, Superior, CO (US)

(73) Assignee: Time Warner Cable LLC, New York, NY (US)

( * ) Notice: Subject to any disclaimer, the term of this patent is extended or adjusted under 35 U.S.C. 154(b) by 1576 days.

(21) Appl. No.: 10/439,620

(22) Filed: May 16, 2003

(65) Prior Publication Data

US 2004/0230994 A1 Nov. 18, 2004

(51) Int. Cl.
*H04N 7/173* (2011.01)
(52) U.S. Cl. ........ 725/88; 725/86; 725/87; 725/89; 725/90; 725/114; 725/105; 725/116; 725/109; 725/103; 725/104
(58) Field of Classification Search ......... 725/9–21, 725/86–104, 109
See application file for complete search history.

(56) References Cited

U.S. PATENT DOCUMENTS

| 5,251,324 | A  | * | 10/1993 | McMullan, Jr. | ........... | 725/14 |
| 5,600,573 | A  | * | 2/1997 | Hendricks et al. | ........... | 725/109 |
| 6,539,548 | B1 | * | 3/2003 | Hendricks et al. | ........... | 725/109 |
| 7,073,189 | B2 |   | 7/2006 | McElhatten et al. | | |
| 7,191,244 | B2 | * | 3/2007 | Jennings et al. | ........... | 709/231 |
| 7,908,626 | B2 |   | 3/2011 | Williamson et al. | | |
| 2002/0194589 | A1 | * | 12/2002 | Cristofalo et al. | ........... | 725/32 |
| 2003/0056217 | A1 |   | 3/2003 | Brooks | | |
| 2004/0261116 | A1 | * | 12/2004 | Mckeown et al. | ........... | 725/109 |
| 2005/0044577 | A1 | * | 2/2005 | Jerding et al. | ........... | 725/135 |
| 2005/0108763 | A1 | * | 5/2005 | Baran et al. | ........... | 725/87 |
| 2006/0080707 | A1 | * | 4/2006 | Laksono | ........... | 725/38 |
| 2006/0236362 | A1 | * | 10/2006 | Istvan et al. | ........... | 725/135 |

FOREIGN PATENT DOCUMENTS

EP 1 089 201 A1 4/2001

\* cited by examiner

*Primary Examiner* — Pankaj Kumar
*Assistant Examiner* — Charles N Hicks
(74) *Attorney, Agent, or Firm* — Brandon N. Sklar, Esq.; Kaye Scholer LLP

(57) ABSTRACT

In a broadband communications system, information is collected which relates to user-issued commands for accessing programming content and manipulating recorded programming content. The commands are monitored to determine when such content is accessed (i.e., requested, selected or played) and manipulated (i.e., rewound, fast-forwarded, paused, etc.) by a user. Data associated with a command to request, select or manipulate programming content is read from the user-issued command and forwarded to a processor for presentation of the programming content. The read data is stored and made available for analyzing user activity respecting programming content provided by the broadband communication system. Such analysis may relate to the popularity of specific programs, the frequency in which specific commercials are skipped or played, the most popular times that a specific program or type of program is accessed, and the like.

59 Claims, 14 Drawing Sheets

| TERMINAL ID 1010 | COMMAND TYPE 1020 | ASSET ID 1030 | CURRENT TIME INFORMATION 1040 | LAPSED PLAY TIME 1050 |
|---|---|---|---|---|
| . . . | . . . | . . . | . . . | . . . |
| 002345 | Select | 11111120 | 06/05/02-08:00:05 | 00:00:00 |
| 344323 | Select | 45325342 | 06/05/02-08:00:26 | 00:00:00 |
| 575755 | Play | 83635472 | 06/05/02-08:01:06 | 00:00:10 |
| 112345 | Fast-Forward | 22221222 | 06/05/02-08:02:15 | 00:02:15 |
| 344323 | Fast-Forward | 35353520 | 06/05/02-08:02:36 | 00:04:20 |
| 112345 | Play | 22221222 | 06/05/02-08:02:45 | 00:03:15 |
| 466787 | Select | 36364489 | 06/05/02-08:03:08 | 00:00:00 |
| 012345 | Pause | 11111120 | 06/05/02-08:03:38 | 00:03:33 |
| 223456 | Select | 99989234 | 06/05/02-08:04:48 | 00:00:00 |
| 735788 | Request | 98932844 | 06/05/02-08:04:59 | 00:15:43 |
| 223456 | Pause | 99989234 | 06/05/02-08:05:09 | 01:02:44 |
| 334783 | Request | 20930214 | 06/05/02-08:06:10 | 00:00:05 |
| 363462 | Request | 95837543 | 06/05/02-08:06:43 | 00:00:02 |
| 334783 | Fast-Forward | 20930214 | 06/05/02-08:07:10 | 00:01:05 |
| 447660 | Request | 03093355 | 06/05/02-08:07:55 | 00:00:02 |
| 858861 | Select | 01221002 | 06/05/02-08:07:58 | 00:00:00 |
| 002345 | Play | 11111120 | 06/05/02-08:08:12 | 00:03:33 |
| 823254 | Select | 84985304 | 06/05/02-08:09:24 | 00:00:00 |
| 464623 | Pause | 98372985 | 06/05/02-08:09:48 | 00:28:25 |
| 447660 | Select | 98373487 | 06/05/02-08:10:34 | 00:00:00 |
| 235324 | Select | 98743972 | 06/05/02-08:11:02 | 00:00:00 |
| 447660 | Rewind | 98373487 | 06/05/02-08:11:06 | 00:00:32 |
| 334783 | Play | 20930214 | 06/05/02-08:11:10 | 00:10:51 |
| 447660 | Play | 98373487 | 06/05/02-08:11:17 | 00:00:10 |
| 858541 | Select | 83487348 | 06/05/02-08:12:33 | 00:00:00 |
| 855365 | Play | 01932870 | 06/05/02-08:13:44 | 02:00:10 |
| 002345 | Stop | 11111120 | 06/05/02-08:14:02 | 00:09:23 |
| 264672 | Select | 95757839 | 06/05/02-08:14:22 | 00:00:00 |
| 747447 | Play | 92864639 | 06/05/02-08:15:12 | 01:00:10 |
| 554978 | Pause | 45612465 | 06/05/02-08:15:43 | 00:02:22 |
| 385778 | Select | 08373322 | 06/05/02-08:15:52 | 00:00:00 |
| 070762 | Request | 09876545 | 06/05/02-08:16:41 | 00:00:35 |
| 767744 | Request | 56876233 | 06/05/02-08:17:12 | 01:59:55 |
| 554978 | Play | 45612465 | 06/05/02-08:17:34 | 00:02:22 |
| 347248 | Play | 72498322 | 06/05/02-08:17:50 | 01:58:10 |
| 156554 | Select | 82738732 | 06/05/02-08:18:34 | 00:00:00 |
| 856563 | Select | 32487643 | 06/05/02-08:19:02 | 00:00:00 |
| 108541 | Play | 29823428 | 06/05/02-08:19:06 | 00:29:22 |
| 085454 | Fast-Forward | 92739272 | 06/05/02-08:20:52 | 00:28:02 |
| 944847 | Request | 09273922 | 06/05/02-08:21:07 | 01:28:56 |
| 748543 | Pause | 09408343 | 06/05/02-08:22:08 | 00:25:01 |
| 176432 | Play | 20983908 | 06/05/02-08:22:44 | 00:00:05 |
| 923423 | Fast-Forward | 83892092 | 06/05/02-08:22:56 | 00:22:54 |
| . . . | . . . | . . . | . . . | . . . |

FIG. 11

| TERMINAL ID 1010 | COMMAND TYPE 1020 | ASSET ID 1030 | CURRENT TIME INFORMATION 1040 | LAPSED PLAY TIME 1050 |
|---|---|---|---|---|
| . . . | . . . | . . . | . . . | . . . |
| 478742 | Select | 93454221 | 06/06/02-12:00:22 | 00:00:00 |
| 478742 | Pause | 93454221 | 06/06/02-12:00:30 | 00:00:08 |
| 767324 | Select | 93454221 | 06/06/02-12:15:43 | 00:00:00 |
| 767324 | Fast-Forward | 93454221 | 06/06/02-12:15:52 | 00:00:09 |
| 767324 | Play | 93454221 | 06/06/02-12:16:01 | 00:00:27 |
| 424264 | Select | 93454221 | 06/06/02-12:48:12 | 00:00:00 |
| 132356 | Select | 93454221 | 06/06/02-12:56:32 | 00:00:00 |
| 478742 | Play | 93454221 | 06/06/02-12:58:58 | 00:00:08 |
| . . . | . . . | . . . | . . . | . . . |

FIG. 12A

| TERMINAL ID 1010 | COMMAND TYPE 1020 | ASSET ID 1030 | CURRENT TIME INFORMATION 1040 | LAPSED PLAY TIME 1050 |
|---|---|---|---|---|
| . . . | . . . | . . . | . . . | . . . |
| 876324 | Play | 01221002 | 06/06/02-03:00:02 | 00:14:38 |
| 100221 | Select | 01221002 | 06/06/02-03:00:34 | 00:00:00 |
| 748703 | Select | 01221002 | 06/06/02-03:05:02 | 00:00:00 |
| 100221 | Rewind | 01221002 | 06/06/02-03:08:06 | 00:08:28 |
| 001234 | Fast-Forward | 01221002 | 06/06/02-03:09:52 | 00:29:02 |
| 100221 | Play | 01221002 | 06/06/02-03:12:07 | 00:00:28 |
| 748703 | Pause | 01221002 | 06/06/02-03:13:08 | 00:08:06 |
| 100221 | Pause | 01221002 | 06/06/02-03:22:44 | 00:11:05 |
| 748703 | Fast-Forward | 01221002 | 06/06/02-03:25:02 | 00:08:06 |
| 100221 | Play | 01221002 | 06/06/02-03:26:34 | 00:11:05 |
| 748703 | Play | 01221002 | 06/06/02-03:28:02 | 00:14:06 |
| 100221 | Rewind | 01221002 | 06/06/02-03:32:06 | 00:16:37 |
| 001234 | Play | 01221002 | 06/06/02-03:33:52 | 01:17:02 |
| 100221 | Stop | 01221002 | 06/06/02-03:34:07 | 00:12:35 |
| 367328 | Select | 01221002 | 06/06/02-03:37:08 | 00:00:00 |
| 938490 | Fast-Forward | 01221002 | 06/06/02-03:41:02 | 00:29:23 |
| 664267 | Select | 01221002 | 06/06/02-03:44:06 | 00:00:00 |
| 827422 | Select | 01221002 | 06/06/02-03:48:52 | 00:00:00 |
| 938490 | Pause | 01221002 | 06/06/02-03:52:07 | 00:51:33 |
| 664267 | Stop | 01221002 | 06/06/02-03:56:08 | 00:12:02 |
| 938490 | Play | 01221002 | 06/06/02-03:59:58 | 00:59:25 |
| . . . | . . . | . . . | . . . | . . . |

FIG. 12B

TECHNIQUE FOR COLLECTING DATA RELATING TO ACTIVITY OF A USER RECEIVING ENTERTAINMENT PROGRAMS THROUGH A COMMUNICATIONS NETWORK

FIELD OF THE INVENTION

The invention relates to communications systems and methods, and more particularly to a system and method for collecting data relating to user activity regarding entertainment programs provided by a communications network, e.g., a cable network.

BACKGROUND OF THE INVENTION

With the advent of digital communications technology, many TV program streams are transmitted in digital formats. For example, Digital Satellite System (DSS), Digital. Broadcast Services (DBS), and Advanced Television Standards Committee (ATSC) program streams are digitally formatted pursuant to the well known Moving Pictures Experts Group 2 (MPEG-2) standard. The MPEG-2 standard specifies, among others, the methodologies for video and audio data compressions which allow multiple programs, with different video and audio feeds, multiplexed in a transport stream traversing a single transmission channel. A digital TV receiver may be used to decode an MPEG-2 encoded transport stream, and extract the desired program therefrom.

MPEG-2 BACKGROUND

In accordance with the MPEG-2 standard, video data may be compressed based on a sequence of groups of pictures (GOPs), made up of three types of picture frames—intra-coded picture frames ("I-frames"), forward predictive frames ("P-frames") and bilinear frames ("B-frames"). Each GOP may, for example, begin with an I-frame which is obtained by spatially compressing a complete picture using discrete cosine transform (DCT). As a result, if an error or a channel switch occurs, it is possible to resume correct decoding at the next I-frame.

The GOP may represent additional frames by providing a much smaller block of digital data that indicates how small portions of the I-frame, referred to as macroblocks, move over time.

An I-frame is typically followed by multiple P- and B-frames in a GOP. Thus, for example, a P-frame occurs more frequently than an I-frame by a ratio of about 3 to 1. A P-frame is forward predictive and is encoded from the I- or P-frame that precedes it. A P-frame contains the difference between a current frame and the previous I- or P-frame.

A B-frame compares both the preceding and subsequent I- or P-frame data. The B-frame contains the average of matching macroblocks or motion vectors. Because a B-frame is encoded based upon both preceding and subsequent frame data, it effectively stores motion information.

Thus, MPEG-2 achieves its compression by assuming that only small portions of an image change over time, making the representation of these additional frames extremely compact. Although GOPs have no relationship between themselves, the frames within a GOP have a specific relationship which builds off the initial I-frame.

The compressed video and audio data are carried by continuous elementary streams, respectively, which are broken into access units or packets, resulting in packetized elementary streams (PESs). These packets are identified by headers that contain time stamps for synchronizing, and are used to form MPEG-2 transport streams. For digital broadcasting, multiple programs and their associated PESs are multiplexed into a single transport stream. A transport stream has PES packets further subdivided into short fixed-size data packets, in which multiple programs encoded with different clocks can be carried. A transport stream not only comprises a multiplex of audio and video PESs, but also other data such as MPEG-2 program specific information (sometimes referred to as metadata) describing the transport stream. The MPEG-2 metadata may include a program associated table (PAT) that lists every program in the transport stream. Each entry in the PAT points to an individual program map table (PMT) that lists the elementary streams making up each program. Some programs are open, but some programs may be subject to conditional access (encryption) and this information is also carried in the MPEG-2 transport stream, possibly as metadata.

The aforementioned fixed-size data packets in a transport stream each carry a packet identifier (PID) code. Packets in the same elementary streams all have the same PID, so that a decoder can select the elementary stream(s) it needs and reject the remainder. Packet-continuity counters may be implemented to ensure that every packet that is needed to decode a stream is received.

In the cable TV industry, a network personal video recorder (NPVR) service has been proposed where programming content is recorded at the headend while it is being broadcast, thereby enabling users to access the recorded programming content from a common storage in the headend after the initial (or live) broadcast of the programming content. In addition, the NPVR service enables users to issue PVR-like manipulation commands, such as "pausing", "rewinding" and "fast-forwarding" the recorded broadcast programming content. The system architecture and design for realizing NPVR service functions are described, e.g., in copending commonly assigned application Ser. No. 10/263,015 filed on Oct. 2, 2002, hereby incorporated by reference. These PVR-like manipulation commands can enhance a user's program viewing experience by, for example, enabling the user to skip or fast-forward programming content that the user does not want to view, and to rewind and repeat the display of programming content that the user would like to view again.

In prior art, the program channel selected at a set-top terminal by a user and the time that the channel is accessed are tracked to identify the programming content that is accessed. The channel and time can be used to correlate to the corresponding broadcast programs, based on program guide data.

SUMMARY OF THE INVENTION

Enabling users to access and manipulate recorded programming content at their command, gives rise to an opportunity for monitoring programming user activity—i.e., monitoring which content is actually displayed to users, which content is skipped, which content is repeated and when the content is transmitted to the user.

The invention transcends the prior art limitations by collecting user activity data relating to issued commands for accessing programming content and manipulating recorded programming content provided through a communications network. The commands are monitored to determine when such content is accessed and manipulated—i.e., fast-forwarded, rewound, etc.—by a user.

Content providers, broadcast networks, advertisers, marketers and those who provide goods or services, often have an interest in monitoring such user activity, as these providers can identify, among other things, the popularity of specific programs, the frequency in which specific commercials are skipped versus played by users, the most popular times that a specific program or type of program is accessed by users, and the like. The stored user activity data may be accessed for analyzing such user activity respecting programming content provided by the broadband communication system.

In one embodiment of the invention, a communications system includes a server for presenting programming content and a device for providing a data stream containing programming content over a communications network, wherein the data stream is identified by an identifier. The system further includes a controller for communicating the identifier to a terminal for receiving the data stream. In addition, a proxy server is configured for receiving from the terminal over the communications network commands relating to the presentation of the programming content, compiling data concerning the received commands, and forwarding the received commands to the server responsive to the commands.

By monitoring commands relating to access to recorded programming content as well as the manipulation of such content, in accordance with an embodiment of the invention, information which identifies user activity concerning the programming content is gathered and may be analyzed.

In another embodiment of the invention, a communications system includes a server for presenting programming content and a device for providing a data stream containing programming content over a communications network, wherein the data stream is identified by an identifier. The system further includes a controller for communicating the identifier to a terminal for receiving the data stream. In addition, a router routes to the server commands relating to a presentation of the programming content which are received from the terminal over the communications network, and a sniffer reads at least a subset of the commands from the router while the commands are being routed through the router. The sniffer is further configured for compiling data concerning the read commands.

BRIEF DESCRIPTION OF THE DRAWINGS

Further objects, features and advantages of the invention will become apparent from the following detailed description taken in conjunction with the accompanying drawing showing illustrative embodiments of the invention, in which:

FIG. 11 illustrates a table exemplifying data fields and data relating to the information collected by the proxy server of FIG. 5;

FIGS. 12A and 12B illustrate tables of data records that are generated for analysis in accordance with an embodiment of the invention;

DETAILED DESCRIPTION

The invention is directed to collection of information concerning user activity with respect to a presentation of programming content (e.g., TV shows) in a broadband communications system. The latter may provide network personal video recorder (NPVR) service, including service functions responsive to personal video recording (PVR)-like commands (such as commercial advance, pausing, rewinding, fast-forwarding, etc.) for manipulating the presentation of programming content. As described below, the communications system is configured for recording broadcast programming content for subsequent review by a user in accordance with the NPVR service. That is, the NPVR service enables a user to access programming content, albeit recorded, after its initial broadcast. Thus, the user may view an initial broadcast program in real-time and/or access a recording of such a program at some point in time after its initial broadcast. The aforementioned manipulation commands can be used to enhance a user's program viewing experience by, for example, enabling the user to fast-forward programming content that the user does not want to view, and to rewind and repeat the display of programming content that the user would like to view again.

Content providers, broadcast networks, advertisers, marketers and other vendors who provide goods or services, often have an interest in statistics relating to users' viewing activity as these providers can identify, among other things, the popularity of specific programs or segments of programming content, the frequency in which specific commercials are skipped versus played, the most popular times that a specific program or type of program is accessed, and the like.

By monitoring access to recorded programming content as well as the manipulation of such content, in accordance with an embodiment of the invention, information useful to vendors which identifies user activity for such programming content is gathered and analyzed.

Figure 1:
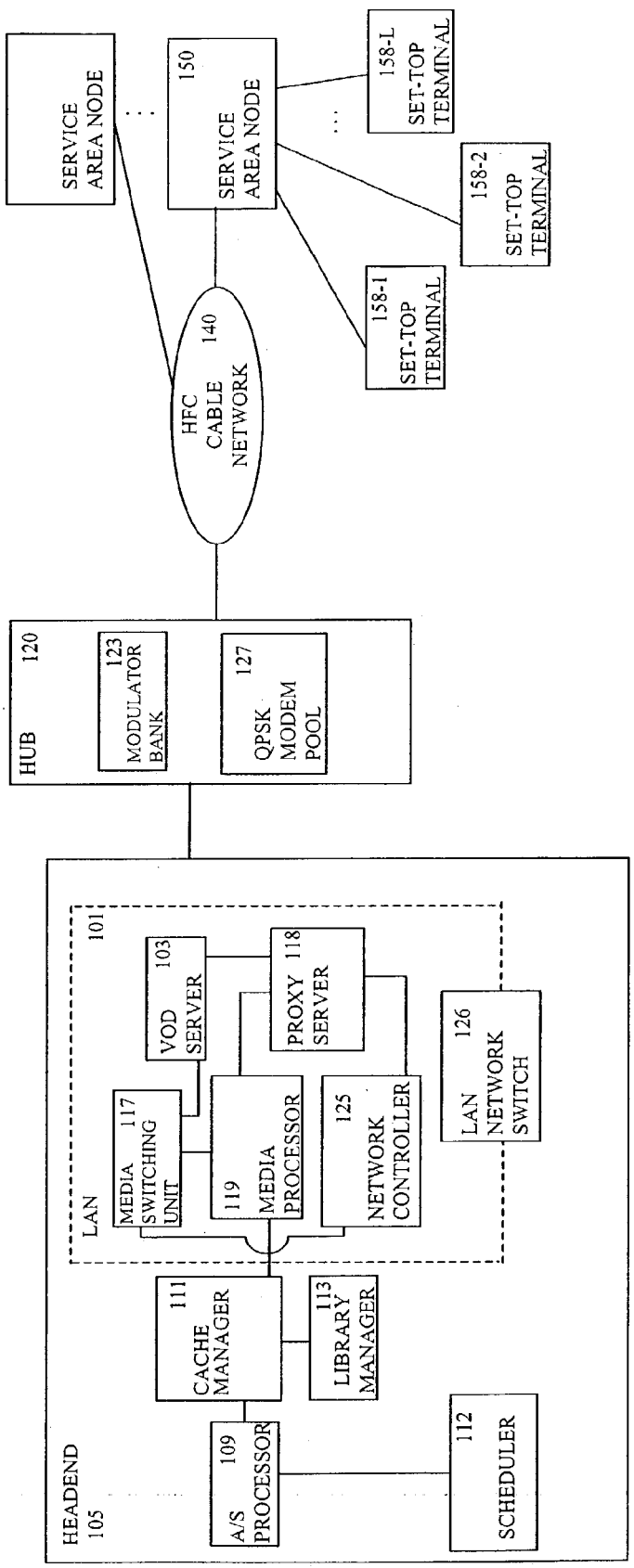
FIG. 1 is a block diagram of a communications system in accordance with an embodiment of the invention.

FIG. 1 illustrates broadband communications system 100 which, among other things, receives programming content, records the programming content, provides interactive programming and services to users, receives commands from users for accessing and manipulating programming content, and collects information relating to such access and manipulation activity.

For example, system 100 in this instance includes a cable system for delivering, in accordance with the invention, information and entertainment programs to set-top terminals on the user premises. As shown in FIG. 1, system 100 includes headend 105, hub 120, hybrid fiber coax (HFC) cable network 140 and different service area nodes including node 150, which in this instance is connected to set-top terminals 158-1 through 158-L in a neighborhood, where L represents an integer.

Headend 105 receives programs and services from various providers and sources, e.g., analog and digital satellite sources, application servers, media servers, the Internet, etc. Analog and digital satellite sources typically provide the traditional forms of television broadcast programs and information services. Application servers typically provide executable code and data for application specific services such as database services, network management services, transactional electronic commerce services, system administration console services, application specific services (such as stock ticker, sports ticker, weather and interactive program guide data), resource management service, connection management services, subscriber cares services, billing services, operation system services, and object management services. Media servers provide time-critical media assets such as MPEG-2 encoded video and audio, MPEG-2 encoded still images, bit-mapped graphic images, PCM digital audio, three dimensional graphic objects, application programs, application data files, etc. Although specific examples of programs and services which may be provided by the aforementioned sources are given herein, other programs and services may also be provided by these or other sources without departing from the spirit and scope of the invention.

Receiving Programming Content And Creating Assets

Acquisition/Staging (A/S) processor 109 in headend 105 processes program materials including, e.g., TV program streams, from one or more of the aforementioned sources in analog and digital forms. Analog TV program streams may be formatted according to the National Television Standards Committee (NTSC) or PAL broadcast standard. Digital TV streams may be formatted according to the Digital Satellite System (DSS), Digital Broadcast Services (DBS), or Advanced Television Standards Committee (ATSC) standard. Processor 109, among other things, extracts program content in the analog and digital TV streams and reformats the content to form one or more MPEG-2 encoded transport streams. Such reformatting may even be applied to those received streams already in an MPEG-2 format. This stems from the fact that the digital content in the received MPEG-2 streams are typically encoded at a variable bit rate (VBR). To avoid data burstiness, processor 109 in a conventional manner re-encodes such digital content at a constant bit rate (CBR) to form the aforementioned transport streams.

An MPEG-2 transport stream contains multiple program streams with different video and audio feeds multiplexed for transmission through the same transmission channel. The program streams representing individual programs are identified by respective program identifications (IDs) within a transport stream. It should be noted at this point that the term "transmission channel" should not be confused with a "program channel." A "transmission channel" signifies a designated frequency band through which a transport stream is transmitted. On the other hand, a "program channel" signifies the source of the program material selected by a user to view. For example, a user may select program channel 2 to view initial broadcast program material provided by CBS; program channel 14 to view initial broadcast program material provided by ESPN; program channel 32 to view initial broadcast program material provided by MTV, etc.

In this illustrative embodiment, the transmission channels, each carrying a transport stream, may be 6 MHz bands populating a forward passband, e.g., 350-750 MHz band, of a coaxial cable, which is allocated for downstream communication from headend 105 to a set-top terminal.

A/S processor 109 may receive "assets" including pre-staged movie videos, news reports, sports events, etc. from content providers. However, in accordance with the invention, processor 109 may also create "assets" in real time while processing received program materials which are not pre-staged by the content providers. In general, an "asset" is a container for any object or set of objects that may be desired to implement a service, including video, audio, images, application executables, scripts, configuration files, text, fonts, and HTML pages. In addition to the raw content, metadata (not to be confused with MPEG-2 metadata) is also a part of an asset object that describes characteristics of the asset. For example, asset metadata may describe attributes that are inherent in the content of the asset, such as the rating, format, duration, size, or encoding method. Values for asset metadata are determined at the time the asset is created.

Figure 2:
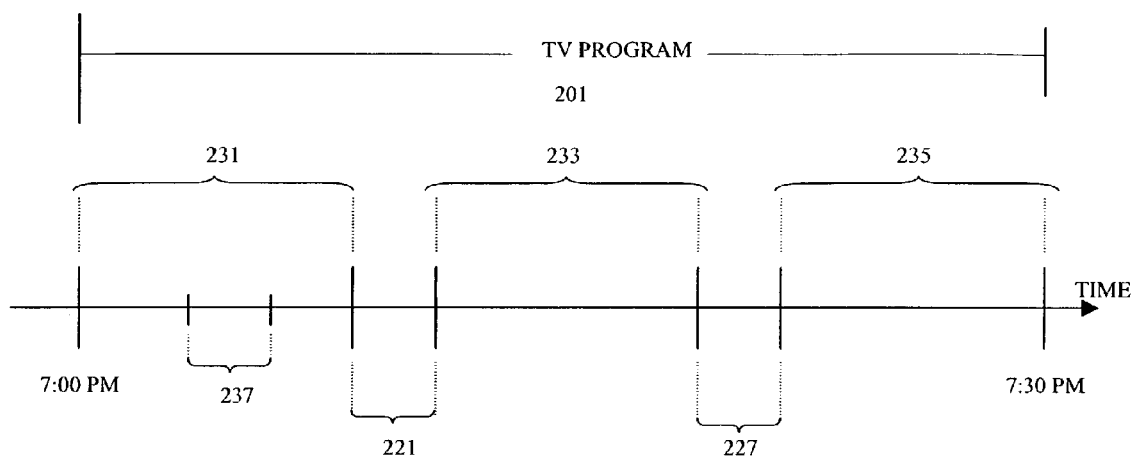
FIG. 2 illustrates a TV program comprising multiple program. segments which is provided in the system of FIG. 1.

In this illustrative embodiment, an asset concerning a program includes a metadata file and trick files associated with the program, in addition to the program content contained in a transport stream. FIG. 2 illustrates TV program 201 which spans from 7:00 p.m. to 7:30 p.m. Program 201 comprises a show interrupted by commercials, which is typical. Thus, the program content in this instance consists of show segments 231, 233 and 235, interleaved with commercial segments 221 and 227.

In accordance with an aspect of the invention, the TV program streams received by processor 109 are pre-processed, e.g., by the providers, to include indicators, e.g., cue-tones, on which processor 109 relies to identify the demarcations (or edges) of different programs and program segments within each program. Thus, in this instance before processor 109 processes the TV program stream containing TV program 201, a first cue-tone has been inserted at the beginning of segment 231, indicating the beginning of TV program 201; second cue-tones have been inserted at the beginnings of segments 221 and 227, indicating the beginnings of the respective commercial segments; third cue-tones have been inserted at the ends of segments 221 and 227, indicating the ends of the respective commercial segments; and a fourth cue-tone has been inserted at the end of segment 235, indicating the end of TV program 201. In accordance with another aspect of the invention, another set of cue-tones may be inserted to delimit a "chapter" (denoted 237) within a program. A chapter is a self-contained subprogram, e.g., a skit, monolog, song performance, news report, weather report, etc. within a program. With the cue-tones defining one such chapter, processor 109 is capable of identifying the chapter and create an asset concerning the same.

Let's assume that TV program 201 in this instance is an initial broadcast program. Processor 109, among other things, collects in a database (not shown) program guide data associated with different TV programs which are not pre-staged (including TV program 201 in this instance) from an application server, which may be different from the sources of the TV programs themselves, such as scheduler 112. Each program when presented to processor 109 is identified by a program designation, which may be used to locate the corresponding program guide data. In particular, processor 109 while processing TV program 201 may locate the corresponding program guide data from scheduler 112 to create in real time the metadata file associated with TV program 201. The metadata file thus created includes such data as the title, rating (e.g., G, PG-13, R, etc.), names of the producer, director, and actors, duration of the program, program type (e.g., situation comedy), etc.

Processor 109 may also create in real time trick files associated with the asset which are used to perform PVR-like functions (e.g., rewinding and fast-forwarding) on program 201 in accordance with the invention. One such trick file in this instance is a "fast-forward" trick file which contains an array of identifiers of I-frames in the program stream (MPEG-2 encoded as mentioned before) corresponding to program 201 in a forward direction. Another trick file is a "rewind" trick file which contains an array of identifiers of I-frames in the program stream corresponding to program 201 in the reverse direction. The I-frame identifiers in the trick files are used as indices or markers for rewinding and fast-forwarding of program 201. It should be noted that not all of the I-frames associated with program 201 are selected for the trick files. Rather, the I-frames are selected periodically along the program stream. Thus, the shorter the period is, the closer the instants from which program 201 can be rewound, and to which program 201 can be fast-forwarded, thereby achieving finer adjustments.

It should be noted that where program 201 is not an initial broadcast program, which may also be pre-staged, commercial segments 221 and 227 may not contain the commercials originally provided by the program provider. Rather, program 201 may be repackaged with after-market commercials, which may be targeted to the user, and which may even be injected anywhere in the program with no regard for original segments 221 and 227 in terms of their timing, duration, or quantity. In the event that program 201 is pre-staged, the program content comes with the corresponding metadata file and trick files associated with the program. Processor 109 stores the created or pre-staged asset including the metadata file and trick files associated with a program according to its program designation in asset storage (not shown), which may reside in library manager 113 described below.

The transport streams generated by processor 109, which contain live TV programs in this instance, are fed to cache manager 111. The latter includes a cache memory (not shown), e.g., a disk cache, having a memory capacity on the order of terabytes. Manager 111 copies the transport streams onto the cache memory, and also forwards the same to library manager 113 for long-term storage. The latter includes library storage having a memory capacity on the order of hundreds of terabytes, much larger than that of the cache memory such that the cache memory stores the last Y hours' worth of the TV programs while the library storage stores the last Z hours' worth of the TV program, where the value of Z is much greater than that of Y. It suffices to know for now that use of the cache memory, which affords faster access to its content than the library storage, facilitates a speedy retrieval of a requested program in the event of a "cache hit," i.e., the requested program being within the last Y hour broadcast. Otherwise, a "cache miss" causes locating the requested program in the library storage, thereby incurring a delay in the retrieval of the program.

Transmission Set-Up, Receiving User Requests, And Transmission Of Content

Network controller 125, among others, assigns resources for transporting program materials to set-top terminals and communicates various data including system information with the terminals. Upstream data from a set-top terminal to network controller 125 is communicated via a reverse passband, e.g., 5-40 MHz band, of a coaxial cable. The reverse passband comprises reverse data channels (RDCs) having a 1 MHz bandwidth in this instance, through which quaternary phase shift keying (QPSK) signals containing upstream data are transmitted. It should be noted that the 1 MHz bandwidth allocated for an RDC here is for illustrative purposes only. It will be appreciated that a person skilled in the art may allocate other bandwidths therefor depending on the actual implementations. A set-top terminal utilizes an RDC for sending both application data and control messages. For example, the Digital Audio Visual Council (DAVIC), a standard setting organization, has defined a contention-based access mechanism whereby multiple set-top terminals share an RDC. This mechanism enables the set-top terminals to transmit upstream messages without a dedicated connection to a QPSK demodulator. The mechanism also provides equal access to the set-top terminals that share the RDC, and enables detection and recovery from reverse path collisions that occur when two or more of the terminals transmit an upstream message simultaneously. As also specified by DAVIC, for communications purposes, the set-top terminals and network controller 125 are identified by the Internet protocol (IP) addresses assigned thereto. However, these IP addresses may be randomly assigned each time when system 100 is reconfigured. As a result, the IP address of a set-top terminal or controller 125 may change after a system reconfiguration. Nevertheless, each set-top terminal and controller 125 is also assigned a media access control (MAC) address on a permanent basis, surviving any system reconfiguration.

Downstream data from network controller 125 to a set-top terminal is communicated via forward data channels (FDCs). These channels, often referred to as "out-of-band" channels, may occupy the 70-130 MHz band of a coaxial cable. QPSK signals containing system messages to a set-top terminal are transmitted through an FDC having a 1 MHz bandwidth in this instance. It should be noted that the 1 MHz bandwidth allocated for an FDC here is for illustrative purposes only. It will be appreciated that a person skilled in the art may allocate other bandwidths therefor depending on the actual implementations.

When a user at a set-top terminal, say, terminal 158-1, turns on the TV associated therewith and selects a particular program channel, say, program channel 2, or change from another channel to channel 2, terminal 158-1 in a well known manner scans for any transport streams transporting programs to the neighborhood. In system 100, each transport stream is identified by a unique transport stream identification (TSID).

Figure 3:
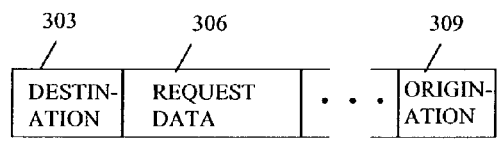
FIG. 3 illustrates a request for recorded program material from a set-top terminal in the system of FIG. 1.

Continuing the above example, once the TSIDs of the transport streams are detected, terminal 158-1 sends through QPSK modem pool 127 a request for program channel 2 material. FIG. 3 illustrates one such request (denoted 300) sent from a set-top terminal to network controller 125 via an RDC. As shown in FIG. 3, request 300 includes, among others, destination field 303 which in this instance contains the IP address of network controller 125 for which request 300 is destined; request data field 306 which contains data concerning the detected TSIDs and the requested program channel material, e.g., program channel 2 material in this instance; and origination field 309 which in this instance contains the IP (and/or MAC) address of terminal 158-1 from which request 300 originates.

It should be noted at this point that, in addition to requesting initial broadcast programming content through the selection of a channel—i.e., recorded content that is currently being broadcast over a program channel in real-time or close to real-time (also referred to as live broadcast programming and in-progress programming)—a user may also request programming content that has already been broadcast and which is recorded and stored by headend 105. Such recorded programming content may be accessed by, for example, issuing a program selection through an electronic program guide (EPG) or some other graphical user interface (GUI) configured for the access of programming content for such recorded content from set-top terminal 158 as part of the aforementioned NPVR service.

A communication protocol used by a set-top terminal for transmitting to headend 105 a selected command to request desired received programming content, and other commands to pause, rewind and fast-forward, is well known in the art, and an example of one such protocol used for such commands is described in "Lightweight Stream Control Protocol," Time Warner Cable, Ver. 1.0, Jun. 10, 1999.

Figure 4:
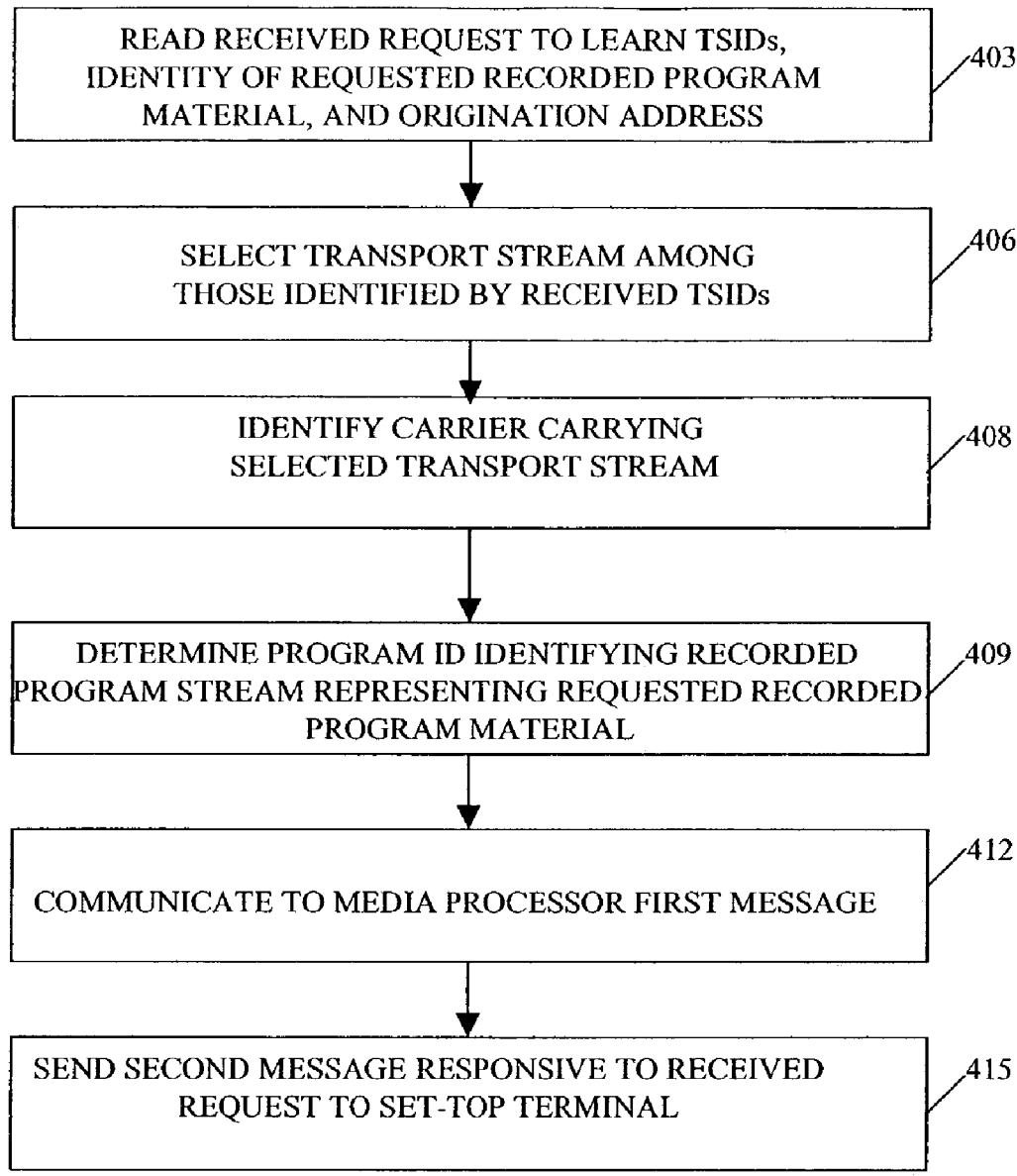
FIG. 4 is a flow chart depicting a process for providing recorded program material in response to the request of FIG. 3.
Figure 7:
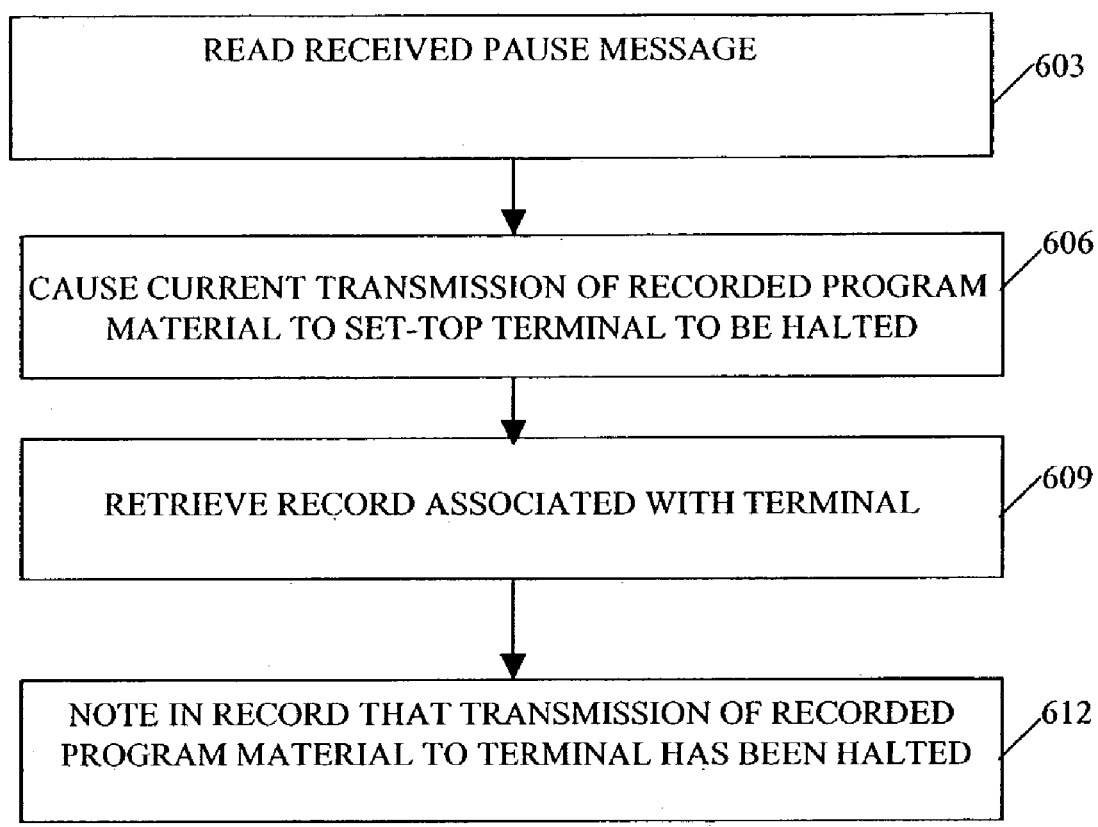
FIG. 7 is a flow chart depicting a process for pausing a recorded program in response to a pause message from a set-top terminal.
Figure 8:
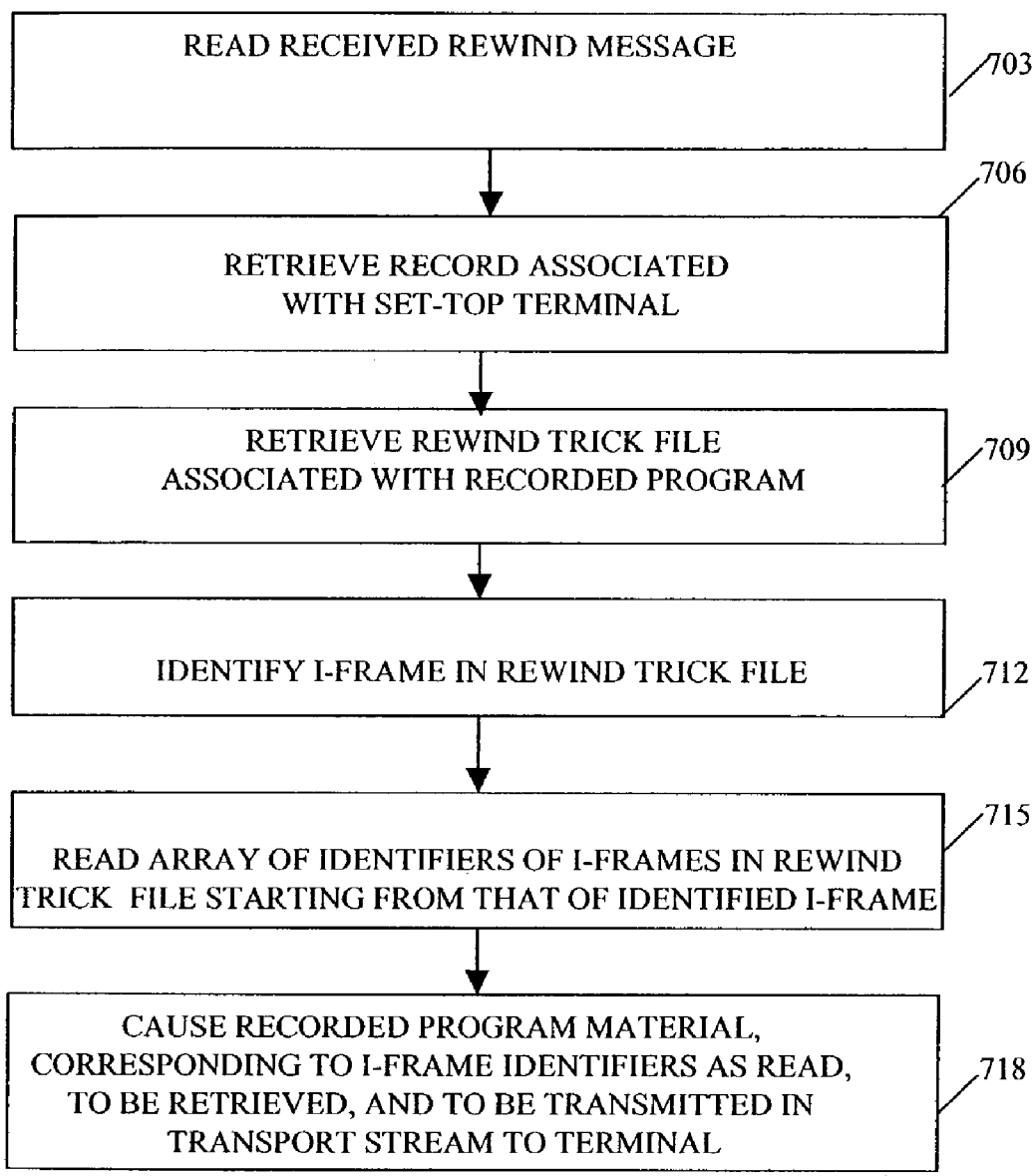
FIG. 8 is a flow chart depicting a process for rewinding a recorded program in response to a rewind message from a set-top terminal.
Figure 9:
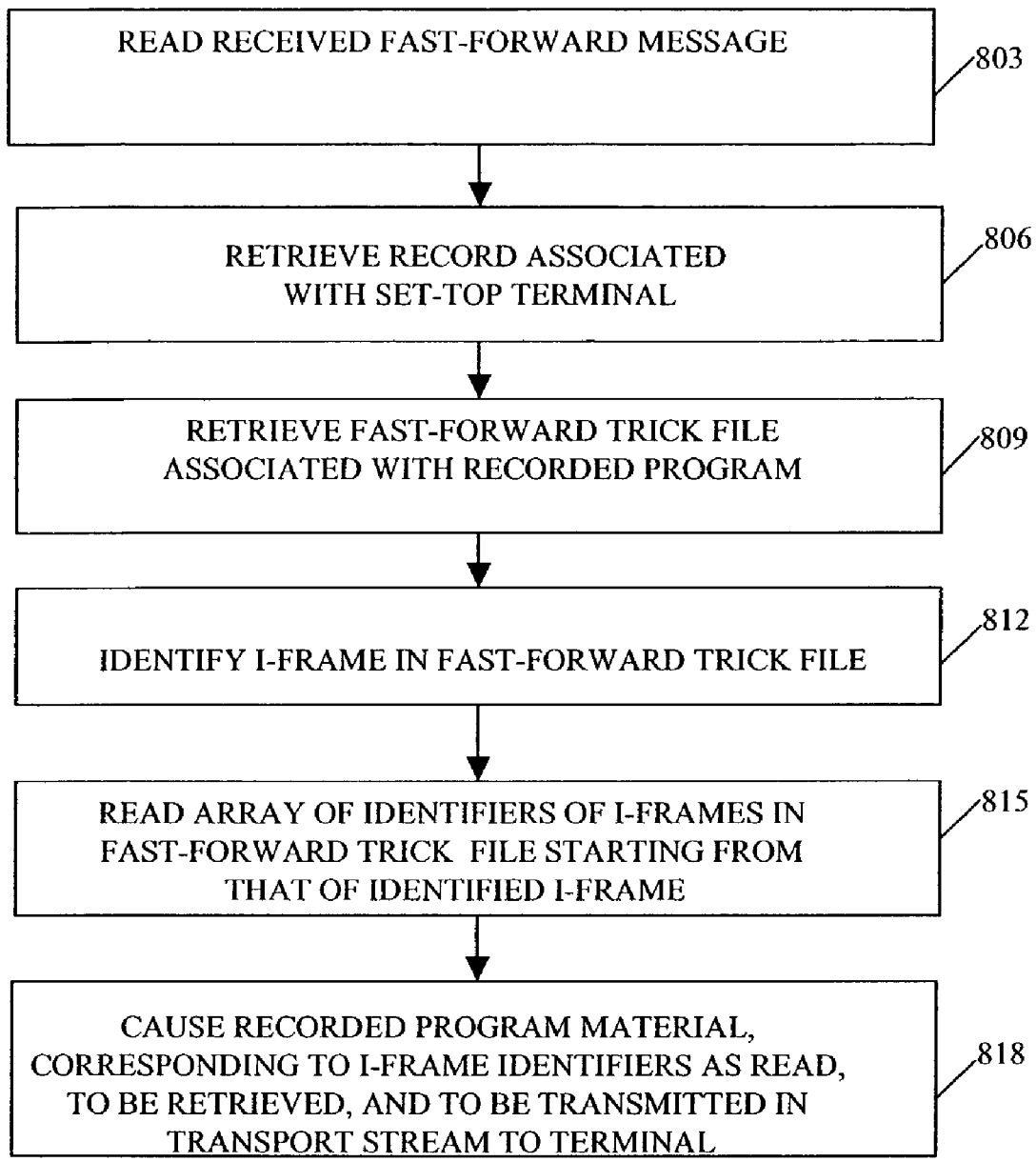
FIG. 9 is a flow chart depicting a process for fast-forwarding a recorded program in response to a fast-forward message from a set-top terminal

After receiving request 300, network controller 125 reads the received request to learn the TSIDs, the identity of the requested program material, and the origination address therein, as indicated at step 403 in FIG. 4. In an embodiment of the invention, proxy server 118 is located in headend 105 and is in communication with network controller 125 and media processor 119. In accordance with an embodiment of the invention, proxy server 118 is configured for reading and forwarding information relating to each program request or selection, as well as each manipulation command, examples of which are described below with reference to FIGS. 7-9. The information captured by proxy server 118 is also described below, with reference to FIGS. 10 and 11.

Figure 5:
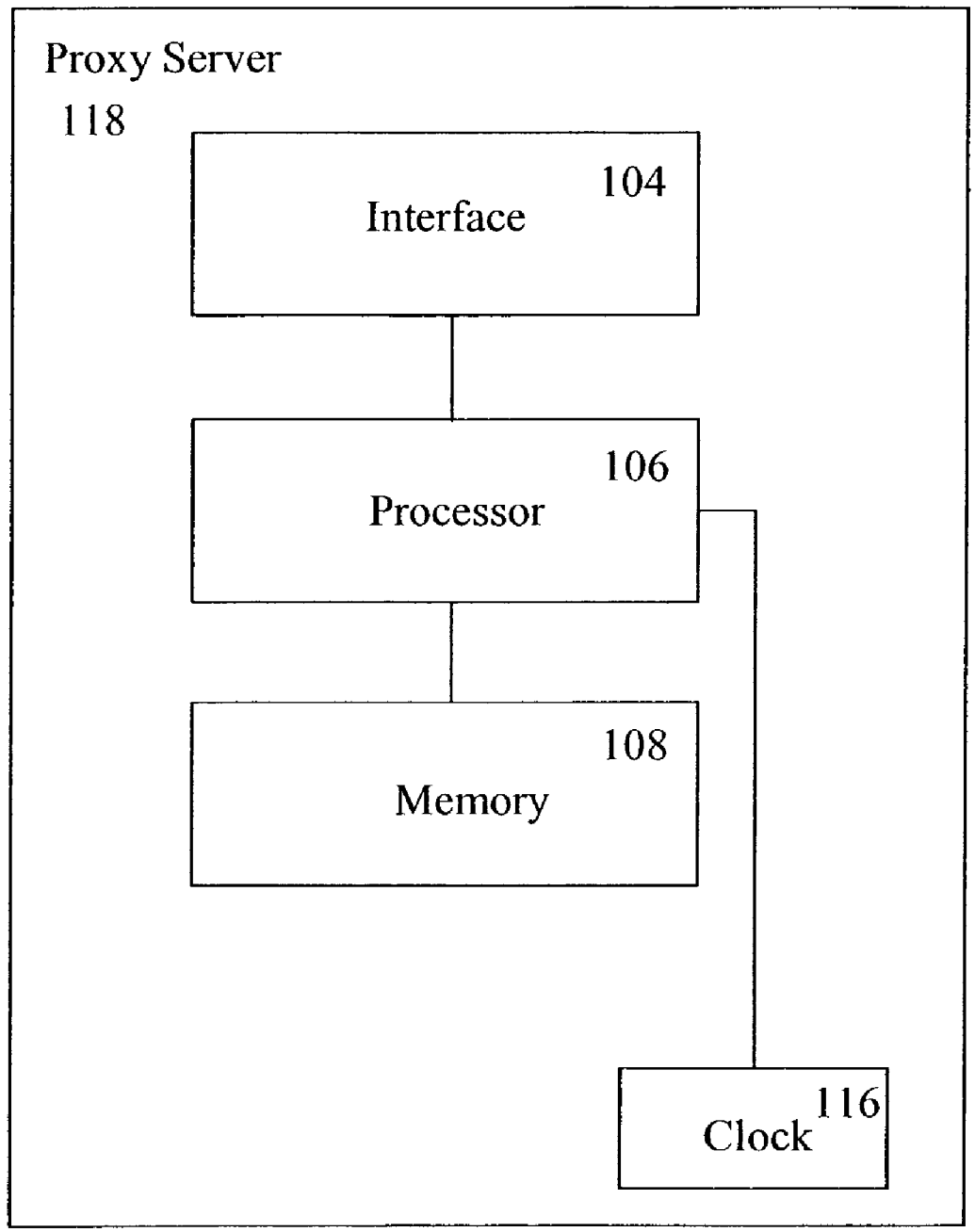
FIG. 5 is a block diagram of a proxy server included in the system of FIG. 1.

Referring to FIG. 5, proxy server 118 illustratively is comprised of interface 104, processor 106 and memory 108. Interface 104 is configured for receiving data from set-top terminal 158-1 associated with user commands, reading such commands and passing the commands onto media processor 119, without modifying the received commands. Processor 106 is configured for, among other things, compiling the data relating to the received commands and memory 108 stores the received command data. Proxy server 118 also includes clock 116, synchronized with the system clock, for generating current date and time information as described below. The type of data that is read, compiled and stored, and the process for doing so, are described more fully below.

In response to received request 300, network controller 125 communicates with media processor 119 through proxy server 118 to determine the capacity required for transmitting the requested program material. Based on the required capacity, controller 125 at step 406 selects a transport stream among those identified by the received TSIDs which is suitable for transporting the requested program material. Controller 125 at step 408 identifies the carrier carrying the selected transport stream.

Figure 6:
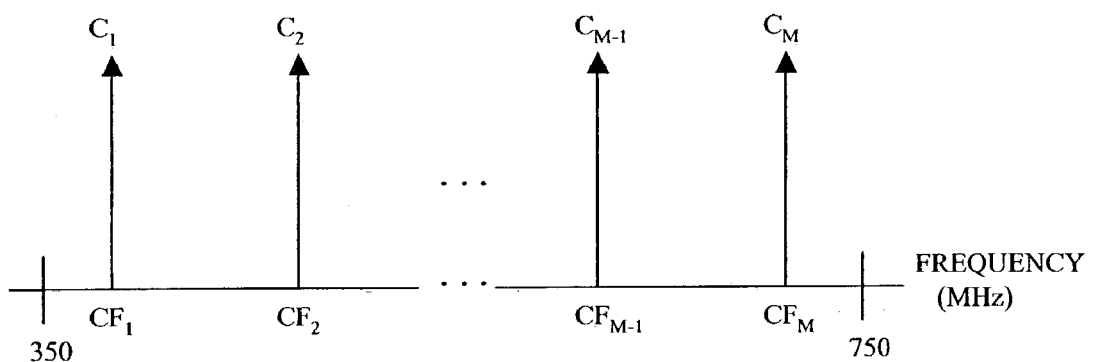
FIG. 6 illustrates selected carriers for transmitting recorded program materials in a forward passband of the system of FIG. 1.

Referring also to FIG. 1, modulator bank 123 in this instance is located in hub 120 connected to headend 105 via IP transport on the one hand and to HFC cable network 140 on the other hand. Bank 123 includes multiple modulators, each of which is used to modulate transport streams onto different carriers. Each modulated carrier carrying a transport stream is transmitted through a transmission channel associated therewith. FIG. 6 illustrates M carriers, $C_1$ through $C_M$, associated with M transmission channels in the forward passband. As shown in FIG. 6, the carrier frequency of $C_1$ is denoted $CF_1$; the carrier frequency of $C_2$ is denoted $CF_2$; . . . ; and the carrier frequency of $C_M$ is denoted $CF_M$. In this example, each program stream may contain 4.2 Mb/s video and audio program data. By using a 256-quadrature-amplitude-modulation (256-QAM) technique and 6 MHz transmission channel, each modulator in modulator bank 123 in this instance may modulate up to 9 program streams, multiplexed in a transport stream, onto the corresponding carrier. The resulting modulated carrier is transmitted through the transmission channel associated with the carrier.

Network controller 125 may include therein a carrier assignment table which lists, for each carrier, the TSID of the transport stream carried thereby. The carrier identification by network controller 125 at aforementioned step 408 may be achieved by looking up from the table the carrier associated with the TSID of the selected transport stream. Based on the requested program channel (for a request of a live program) or the requested recorded program identified by a user's command to play such program, network controller 125 at step 409 determines the program ID identifying the program stream representing the requested program material, which is then multiplexed with other program streams in the selected transport stream. At step 412, network controller 125 communicates to media processor 119 through proxy server 118 a first message containing the identity of the modulator in modulator bank 123 which corresponds to the carrier, say, $C_1$, just determined, and the program ID associated with the requested program material just determined. Network controller 125 at step 415 sends, through QPSK modem pool 127, a second message responsive to the received request to set-top terminal 158-1 identified by the origination IP (and/or MAC) address in field 309 of request 300. This second message traversing an FDC contains the information concerning the carrier frequency i.e., $CF_1$ in this instance, to which terminal 158-1 should tune to receive the appropriate transport stream, and the program ID for extracting the desired program stream within the transport stream.

In response to the first message, processor 119 directs cache manager 111 to deliver a copy of the program stream representing the requested program material thereto and causes the program stream to be multiplexed with any other program streams already in the transport stream identified by the selected TSID. In addition, processor 119 causes media switching unit 117 to switch the resulting transport stream to the modulator corresponding to the carrier $C_1$. Accordingly, the modulator modulates the carrier $C_1$, with the received transport stream, and causes transmission of the modulated carrier through the transmission channel associated with $CF_1$.

Based on the information in the second message, terminal 158-1 tunes to the carrier frequency $CF_1$ to receive the transmitted transport stream, and extracts therefrom the desired program stream, representing the requested program material in this instance. In a well known manner, terminal 158-1 converts the extracted program stream to appropriate signals for the associated TV to play the requested program material.

While the requested program material is being played, terminal 158-1 continuously registers the last I-frame identifier in the received transport stream. From time to time, terminal 158-1 sends a "heartbeat" containing the IP (and/or MAC) address identifying terminal 158-1 and the last I-frame identifier to media processor 119. Processor 119 keeps, for terminal 158-1, a record identified by the IP (and/or MAC) address of terminal 158-1, and tracks the program being transmitted to terminal 158-1 and its I-frame progress. When processor 119 no longer receives heartbeats from terminal 158-1, e.g., because of an off state of the terminal, processor 119 may cause the transmission of the transport stream to terminal 158-1 to be halted.

It should be noted that in this illustrative embodiment, media switching unit 117, media processor 119, network controller 125, VOD server 103 and proxy server 118 are in communication with one another via a local area network (LAN) 101 in headend 105. For example, LAN 101 may be an Ethernet. Media switching unit 117, media processor 119, network controller 125, VOD server 103 and proxy server 118 of headend 105, in this instance, are connected to LAN switch 126 and are thereby in communication with one another through LAN 101. The data communicated between these headend components in the manner described above is routed through switch 126 based on the processing instructions therein and routing information associated with the data.

Pause Command

When the user issues a pause command to terminal 158-1, e.g., by pressing a "pause" key on a remote control associated therewith to temporarily stop the progress of the program, terminal 158-1 issues a pause message to media processor 119 identified by its IP address. The process for pausing programming content is described below with reference to FIG. 7. The pause message in this instance includes a pause initiation command, the last I-frame identifier registered by terminal 158-1, and the IP and/or MAC address of terminal 158-1. After issuing the pause message, terminal 158-1 enters a pause state and causes the picture corresponding to the next I-frame, say I-frame$_{pause}$, to be frozen on the TV screen, thereby achieving the pause effect. The pause message, however, passes through proxy server 118 before it reaches processor 119, in accordance with the invention. Processor 119 reads the received pause message, as indicated at step 603 in FIG. 7. Processor 119 at step 606 causes the current transmission of the program material to set-top terminal 158-1 (identified by the received IP and/or MAC address) to be halted at the I-frame immediately following the last I-frame identified in the received message. Processor 119 at step 609 retrieves the record associated with terminal 158-1. Processor 119 at step 612 notes in the record that the transmission of the program material to terminal 158-1 has been halted at I-frame$_{pause}$.

When the user issues a command to resume viewing the program material, e.g., by toggling the pause key on the remote control, terminal 158-1 exits the pause state, sends a resumption message to processor 119, and readies itself to receive the program material starting from I-frame$_{pause}$. This resumption message includes a resumption command, and the IP and/or MAC address of terminal 158-1. The resumption message passes through proxy server 118 before it reaches processor 119, in accordance with the invention. Processor 119 then retrieves the record associated with terminal 158-1 identified by the received IP and/or MAC address. In response to the resumption command, processor 119 causes the transmission of the program material to terminal 158-1 to be restarted from I-frame$_{pause}$, and notes in the record the transmission resumption event. As a result, terminal 158-1 resumes receiving the program material in the same program stream delivered thereto before. It should be noted that use of a MAC address, instead of an IP address, to identify terminal 158-1 may be advantageous here especially when the pause state is long, so much so that a reconfiguration of system 100 may have occurred during such a state. In that case, the IP address identifying terminal 158-1 before the system reconfiguration may be different than that after the reconfiguration, and as a result, by using only the pre-reconfiguration IP address of terminal 158-1 for its identification, the resuming program stream would not be delivered to the intended terminal 158-1 after the reconfiguration. On the other hand, since the MAC address of terminal 158-1 is immutable and survives any system reconfiguration, by relying on the MAC address of terminal 158-1 for its identification here, the resuming program stream would be correctly delivered to terminal 158-1 even after a system reconfiguration.

Rewind Command

While viewing a program, the user may issue a rewind command, e.g., by pressing a rewind key on the remote control, to rewind the program. In that case, terminal 158-1 issues a rewind message to processor 119 identified by its IP address. This rewind message includes a rewind initiation command, the last I-frame identifier registered by terminal 158-1, and the IP address (and/or MAC address) identifying terminal 158-1. Such a rewind message, however, passes through proxy server 118 before it reaches processor 119, in accordance with the invention. Processor 119 then reads the received rewind message as indicated at step 703 in FIG. 8. Processor 119 at step 706 retrieves the record associated with set-top terminal 158-1 identified by the received IP address (and/or MAC address). Knowing from the record the identity of the program being transmitted, processor 119 at step 709 retrieves from the aforementioned asset storage the rewind trick file associated with the program. Based on the last I-frame information in the received message, processor 119 at step 712 identifies the I-frame in the rewind trick file which either matches or is the closest to that last I-frame. Processor 119 at step 715 reads the array of identifiers of the I-frames in the rewind trick file starting from that of the identified I-frame. Processor 119 at step 718 causes the program material, corresponding to the I-frame identifiers as read, to be retrieved from cache manager 111, and to be transmitted in the transport stream to terminal 158-1, thereby achieving the desired rewind effect.

When the user issues a command to stop rewinding the program, e.g., by toggling the rewind key on the remote control, terminal 158-1 sends a rewind termination message to processor 119. This message includes a rewind termination command, and the IP address (and/or MAC address) of terminal 158-1. The message passes through proxy server 118 before it reaches processor 119, in accordance with the invention. In response to the rewind termination command, processor 119 stops reading the rewind trick file associated with the program. Processor 119 learns from the record associated with terminal 158-1 the last I-frame identifier read from the rewind trick file. Processor 119 causes retrieval of the program material at the normal forward speed from cache manager 111 starting from the I-frame identified by the last read identifier, and transmission of the retrieved program material to terminal 158-1. As a result, terminal 158-1 resumes receiving the program material at the normal forward speed in the same transport stream.

Fast-Forward Command

While viewing a recorded program, the user may issue a fast-forward command, e.g., by pressing a fast-forward key on the remote control, to fast-forward the program. In that case, terminal 158-1 issues a fast-forward message to processor 119 identified by its IP address. This fast-forward message includes a rewind initiation command, the last I-frame identifier registered by terminal 158-1, and the IP address (and/or MAC address) identifying terminal 158-1. Such a fast-forward message, however, passes through proxy server 118 before it reaches processor 119, in accordance with the invention. Processor 119 then reads the received fast-forward message, as indicated at step 803 in FIG. 9. Processor 119 at step 806 retrieves the record associated with set-top terminal 158-1 identified by the received IP address (and/or MAC address). Knowing from the record the identity of the program being transmitted, processor 119 at step 809 retrieves from the aforementioned asset storage the fast-forward trick file associated with the program. Based on the last I-frame information in the received message, processor 119 at step 812 identifies the I-frame in the fast-forward trick file which either matches or is the closest to that last I-frame. Processor 119 at step 815 reads the array of identifiers of the I-frames in the fast-forward trick file starting from that of the identified I-frame. Processor 119 at step 818 causes the program material, corresponding to the I-frame identifiers as read, to be retrieved from cache manager 111, and to be transmitted in the transport stream to terminal 158-1, thereby achieving the desired fast-forward effect.

When the user issues a command to stop fast-forwarding the program, e.g., by toggling the fast-forward key on the remote control, terminal 158-1 sends a fast-forward termination message to processor 119. This message includes a fast-forward termination command, and the IP address (and/or MAC address) of terminal 158-1. The message passes through proxy server 118 before it reaches processor 119, in accordance with the invention. In response to the fast-forward termination command, processor 119 stops reading the fast-forward trick file associated with the program. Processor 119 learns from the record associated with terminal 158-1 the last I-frame identifier read from the fast-forward trick file. Processor 119 causes retrieval of the program material at the normal forward speed from cache manager 111 starting from the I-frame identified by the last read identifier, and transmission of the retrieved program material to terminal 158-1. As a result, terminal 158-1 resumes receiving the program material at the normal forward speed in the same transport stream.

Monitoring User Activity

As described above, proxy server 118 collects information relating to program requests, program selections and manipulation commands that are received by headend 105. The collected information is then stored and made available for tracking user activity respecting programming content provided over system 100.

Figure 10:
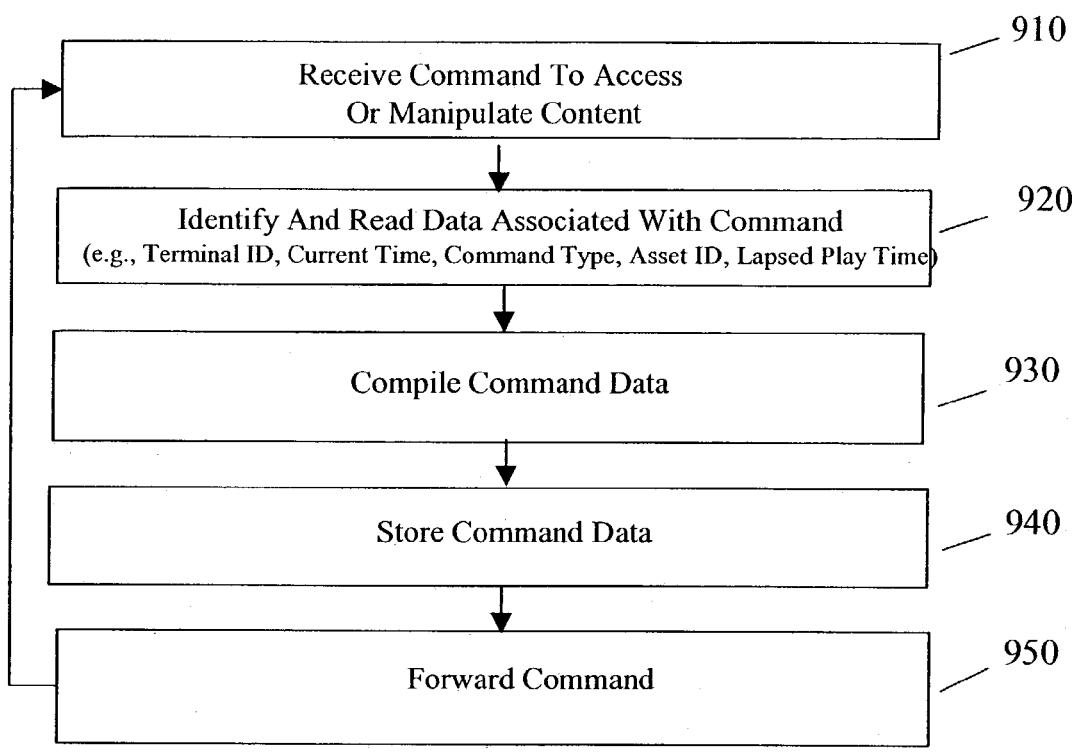
FIG. 10 is a flow chart depicting a process for collecting data relating to user activity respecting programming content in accordance with an embodiment of the invention.

FIG. 10 is a flowchart depicting a process for collecting data relating to user activity respecting programming content transmitted by system 100, in accordance with an embodiment of the invention. In addition, data fields 1100 indicating the type of data that is collected by the process illustrated in FIG. 10 and examples of such data 1150 are illustrated in FIG. 11.

In steps 910 and 920, each time a user issues a command to access or manipulate recorded programming content, interface 104 of proxy server 118 receives the command (step 910). Server 118 identifies and reads (step 920) data associated with the program request, program selection or manipulation command. Proxy server 118 is programmed to read certain data associated with the issued command.

The read data relates to, in accordance with an embodiment of the invention, Terminal Identification information (Terminal ID) 1010, Command Type Information 1020, Asset Identification (ID) 1030 and Current Time Information 1040. Terminal ID 1010 is information that identifies the set-top terminal 158, e.g., its MAC address, from which the command is transmitted to headend 105. By identifying the terminal ID, additional information may be further obtained, such as the location (neighborhood or billing address) of set-top terminal 158, the identity of the cable service subscriber at terminal 158 and the like. Such additional information is stored in one or more databases (not shown), e.g., a billing data database.

Command Type information 1020 includes an indication of the type of command that is issued by a user and received at headend 105. These commands include, e.g., request, select, pause, stop, play, rewind and fast-forward commands.

Asset ID 1030 (such as a numeric or alphanumeric string) may be used to identify the asset that the user is accessing or manipulating. When a previously broadcast program (that has been recorded), identified by an Asset ID 1030, is selected or manipulated by a user at, say, set-top terminal 158-1, the selection triggers transmission of the Asset ID 1030 associated with the selection. Asset ID 1030 is then transmitted to headend 105 as part of the user's selection or manipulation command. However, an in progress broadcast program at a given time is identified based on the time in question and program channel to which terminal 158-1 is tuned. This is accomplished by transmitting to scheduler 112 current time and selected channel information respecting the requested programming content. Scheduler 112 receives information relating to the time that a program is scheduled to broadcast. Programming schedule data may be received from, for example, an electronic program guide (EPG) server (not shown), and includes a program identification code for each program and the start time respecting each program. For an in-progress program, Asset ID 1030 would be replaced by the analogous program identification.

In accordance with an embodiment of the invention, proxy server 118 includes clock 116 for generating current date and time information (referred hereinafter as Current Time Information) 1040 when a program request, program selection or manipulation command is received. In another embodiment of the invention, Current Time Information 1040 may be generated and transmitted by set-top terminal 158-1 as part of a program request, program selection or manipulation command data to be read by proxy server 118.

Proxy server 118 further identifies data that is associated with the programming content for which a user command is received. As described above, an asset is designated a unique Asset ID 1030 and this information is obtained by interface 104 of proxy server 118 when a user issues a program request, program selection or manipulation command. Once the proxy server 118 identifies the Asset ID 1030 of the asset for which a request, selection or manipulation command was received, proxy server 118 accesses session data to, among other things, identify the point within the asset the user issued the request, selection or command. In accordance with an embodiment of the invention, this point may be identified in terms of the difference in time, at normal play speed, between the beginning of an asset and the point within the asset in which a user-issued command has been received.

This measurement of time—referred to herein as Lapsed Play Time 1050—may be obtained by identifying the user-accessed asset's Normal Play Time (NPT). NPT is a value associated with an accessed asset which advances in real-time in normal play mode, advances faster than real-time when the asset is fast-forwarded, decrements when the asset is rewound and is fixed when the asset is paused. Thus, if a user selects an asset for display and watches it for, let's say, exactly five minutes, an NPT value of 0 hours, 5 minutes and 0 second is generated by the server or processor (e.g., media processor 119) that is providing the content from headend 105 to set-top terminal 158. This value is also read by proxy server 118 for received command.

Once the data for a received command is read, processor 106 then compiles the associated data (step 930) for storage in memory 108 of proxy server 118 (step 940). In another embodiment of the invention, the data is transmitted from proxy server 118 to a database (not shown) which is external to proxy-server 118. Such data transmission may be performed, for example, at a predetermined frequency (e.g., once per second, per minute, per hour or per day), or when the available storage capacity of proxy server 118 reaches a predetermined threshold.

The received command is then forwarded to media processor 118 for accessing or manipulating a presentation of programming content (step 950). Thus, it should be noted that as far as processor 119 is concerned, server 118 performs a transparent read-and-forward function, unaffecting the received command.

Thus, suppose a user issues a command to select a recorded broadcast of a baseball game. The command is transmitted to interface 104 of proxy server 118, wherein server 118 reads the Terminal ID (e.g., 344323) of the set-top terminal from which the command was issued and information relating to the type of command that was received (in this instance, Select). The asset ID (e.g., asset 45325342 which corresponds to New York Yankees Baseball for Jun. 5, 2002) is also read from the user's command. In addition, the date and time that the command was received by server 118 is provided by clock 116 (e.g., 06/05/2002-08:00:26). The associated session data is also identified by proxy server 118—e.g., time 00:00:00 which relates to the Lapsed Play Time 1050 of the selected asset (which at this point is 00:00:00 because the user has only just selected the asset for playing). The data associated with the received command is then compiled and stored as a record, such as, in this example, record 1152 of FIG. 11.

If, for example, the user issued a fast-forward (as two times (2×) normal speed) command, let's say, 2 minutes and 10 seconds later, the resulting record stored in memory 108 would indicate: the same Terminal ID as in record 1102 since the command issued from the same terminal (i.e., 344323), the issued Command Type (fast-forward), the same Asset ID as in record 1152 since the command relates to the same asset (i.e., 45325342), the Current Time Information as 2 minutes and 10 seconds later than that for record 1152 (i.e., 06/05/2002-08:02:36) and Lapsed Play Time (00:04:20). In this example, the Lapsed Play Time advanced 4 minutes and 20 seconds indicating that the issued fast-forward command was a 2 times normal speed fast-forward—i.e., ((2 minutes and 10 seconds)×2). This resulting record is illustrated as record 1155 of FIG. 11.

In accordance with an embodiment of the invention, one or more records may then be selected for analyzing user activity based upon the records generated by proxy server 118 or the underlying data of one or more such records. Such records or data may be used by content providers, or others, that are interested in tracking user activity, in various ways. Two examples of tables comprising records generated for analyzing the data listed therein are illustrated, in accordance with an embodiment of the invention, in FIGS. 12A and 12B, and are described below.

For example, suppose an advertiser wants to identify whether a given commercial is frequently selected or frequently fast-forwarded by users. By searching for and accessing records matching an Asset ID 1030 concerning the commercial of interest, information relating to Command Types 1020 that were issued, and the point in the commercial in which the commands were received (identified by Lapsed Play Time 1050), may be analyzed for generating user activity data respecting such commercial. By totaling the number of records in which a program request or program selection was issued for that Asset ID, processor 106 can determine the number of times that the commercial was accessed for display. In addition, by totaling the number of records in which a fast-forward command was received during the commercial having that Asset ID, processor 106 can determine the number of times that the commercial was fast-forwarded (at least partially) or otherwise manipulated.

Thus, suppose asset ID (93454221) is a commercial. Referring to FIG. 12A, table 1200 indicates that between 12:00:22 and 12:58:58 on Jun. 6, 2002, such commercial was accessed and manipulated. By totaling the number of unique Terminal ID's that have accessed or manipulated such commercial during this time period, processor 106 can determine the number of terminals that have displayed the commercial—in this case 4 (i.e., 478742, 767324, 424264 and 132356). In addition, by analyzing which records contain a command type relating to a fast-forward command, processor 106 can determine the number of terminals that have fast-forwarded the commercial, at least in part, is 1 (i.e., 767324).

In another example, suppose a content provider is interested in identifying whether a given recorded program has been accessed at a given time and the number of terminals that have accessed such program by neighborhood. By accessing records relating to Asset ID 1030 concerning the program of interest, processor 106 can total the number of terminals that accessed the program. Then, by analyzing the Current Time Information 1040 respecting the time in which the select command was received, the times of such access may be identified. In addition, by analyzing the Terminal ID 1010 associated with each selection command, the location of terminals that issued the command to access the program may be identified. Thus, referring to FIG. 12B, table 1250 indicates that, from 3:00:02 to 3:59:58 on Jun. 6, 2002, 8 terminals (i.e., 876324, 100221, 748703, 001234, 367328, 938490, 664267, 827422) accessed the program having asset ID 01221002. By accessing a billing data database, the location of terminals accessing this program may be identified, based upon the received Terminal ID 1010.

In yet another example, suppose a network provider is paid a complete fee each time a commercial is played in its entirety, a partial fee each time at least half of the commercial is played (but not in its entirety), and no fee when less than half of a given commercial's content is played. By accessing information relating to Asset ID 1030 concerning a commercial segment of interest, and the amount of normal play time that has lapsed—Lapsed Play Time 1050—for that asset, processor 106 can access such data to determine the number of times such commercial was displayed in its entirety or partially; and for those commercials that were only partially displayed, the percentage of time that the commercial was viewed can be calculated by comparing the Lapsed Play Time 1050 to the total commercial duration.

Thus, returning to FIG. 12A, suppose asset ID 93454221 relates to a 30 second commercial. Processor 106 can calculate the total number of terminals that accessed the commercial during a given period—in this example, 4 terminals accessed the commercial from 12:00:22 to 12:58:58 on Jun. 6, 2002. In addition, processor 106 can determine that only one terminal (terminal ID 767324) issued a manipulation command. Further, by analyzing records associated with terminal ID 767324—i.e., records 1203, 1204 and 1205—processor 106 can calculate that only 12 seconds of the commercial were played and 18 seconds of the commercial were fast-forwarded. For example, by comparing successive records for terminal ID 767324, processor 106 recognizes that the first 9 seconds of Asset ID 93454221 were played (i.e., lapsed play time of record 1204 (00:00:09) less the lapsed play time of record 1203 (00:00:00)=00:00:09), that the next 18 seconds were fast-forwarded (i.e., lapsed play time of record 1205 (00:00:27) less the lapsed play time of record 1204 (00:00:09)=00:00:18), and that the remaining 3 seconds were played (i.e., the total length of the commercial (00:00:30) less the lapsed play time of record 1205 (00:00:27)=00:00:03). Thus, 12 seconds (i.e., 00:00:09+00:00:03=00:00:12) of the 30 second commercial were played and 18 seconds were fast-forwarded.

Based on the disclosure heretofore, it is apparent to a person skilled in the art that the above-described monitoring of user-issued commands transmitted from a set-top terminal to media processor 119 and/or network controller 125 in serving a TV broadcast program similarly applies to serving of other types of asset, e.g., a music video, news event, weather report, traffic report, sports event, video-on-demand (VOD), an audio-on-demand, etc. For example, in serving a VOD presentation requested by a user, VOD server 103 may be included in headend 105 to provide well known VOD server functions (e.g., receiving VOD requests, scheduling video presentations, etc.) and to retrieve a copy of the requested VOD from, for example, the library storage. Proxy server 118, in accordance with the invention, receives user-issued commands relating to a presentation of VOD content, collects data concerning the commands and then forwards the commands to VOD server 103 which responds to the command accordingly.

Figure 13:
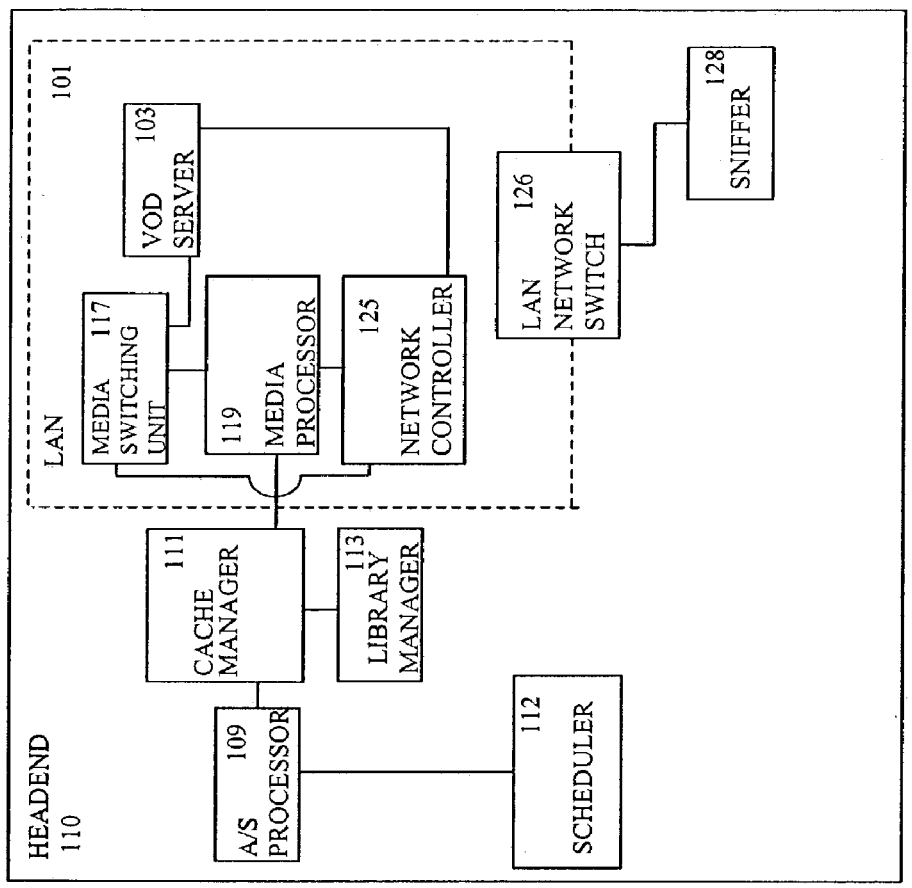
FIG. 13 is a block diagram of a headend of a communications system in accordance with an embodiment of the invention.
Figure 14:
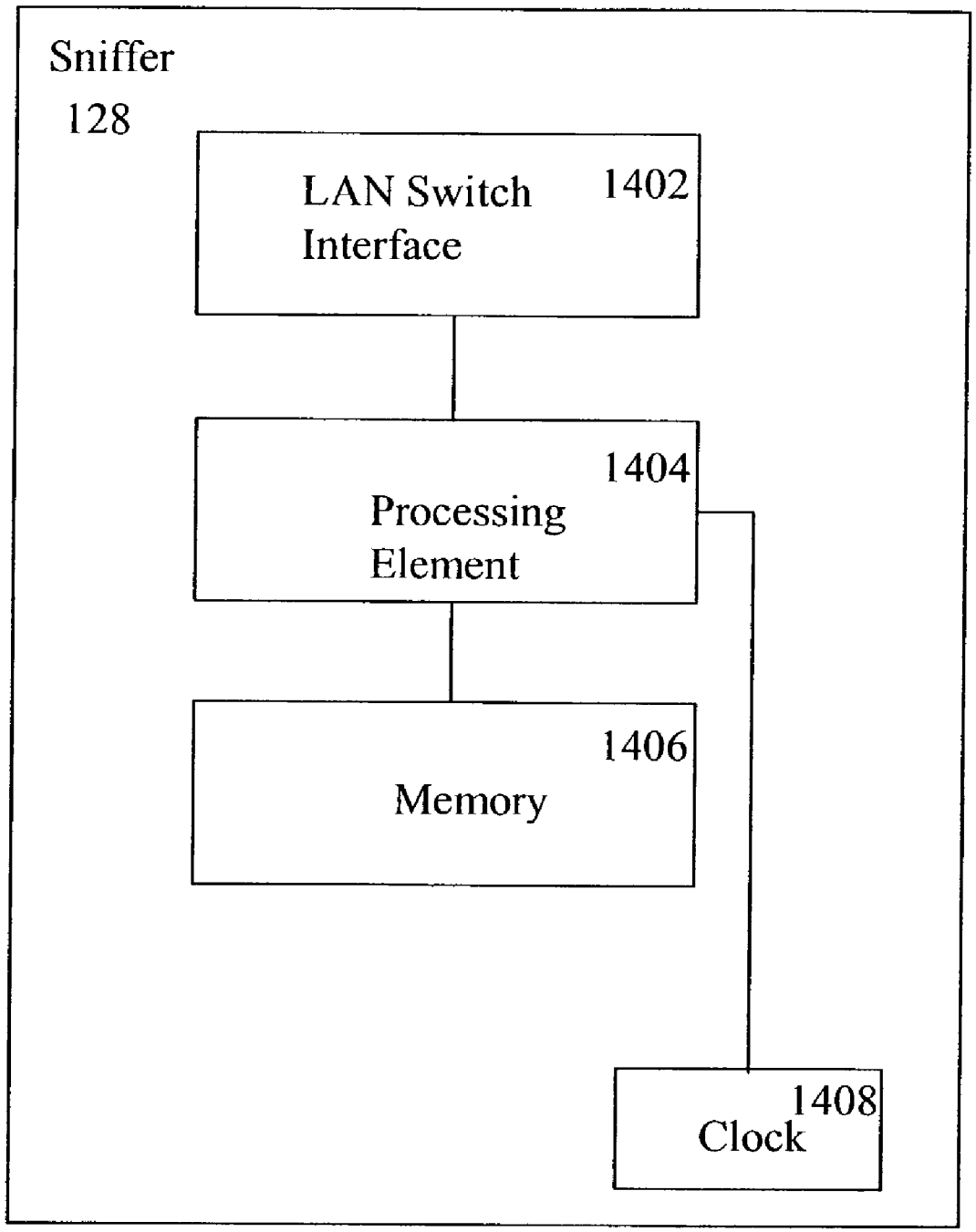
FIG. 14 is a block diagram of a sniffer included in the headend of FIG. 13.

In a second embodiment of the invention, headend 105 in system 100 is replaced by headend 110 in FIG. 13. Like headend 105, headend 110 is configured for, among other things, the collection of user activity data. Unlike headend 105, headend 110 uses, instead of proxy server 118, a sniffer 128 in communication with LAN switch 126 for the collection of such data. FIG. 14 illustrates sniffer 128 which includes LAN switch interface 1402, processing element 1404, memory 1406 and clock 1408.

Each time a user at a set-top terminal issues a command to access or manipulate recorded programming content, the data associated with the user's command is first received by LAN switch 126. Switch 126 then determines, based upon the packet ID information associated with the received command data, the appropriate component (such as VOD server 103, media processor 119, etc.) to which the data should be forwarded. This is accomplished by reading the address of the component to which the data should be transmitted.

In this second embodiment, switch 126 is put in "promiscuous" mode whereby sniffer 128, whose interface 1402 is connected to a port of switch 126, is allowed to listen to the received command data routed through switch 126. Processing element 1404 then determines whether the received data relates to information for which collection is desired. If the collection of such data is determined not to be desired, the data is disregarded. If, however, the received data relates to information that is determined by processing element 1404 to be desired, the data is read into memory 1406 or forwarded to external storage connected to sniffer 128 for its collection. In addition, sniffer 128 may include clock 1408 to provide information relating to the data and time data is read by sniffer 128. Such date and time information may be collected as well, along with the related data. Analyses of the collected data may be accomplished by a data analyzer (not shown) in the manner described above.

It should be noted that, in this second embodiment, the data collection function performed by sniffer 128 is independent of the normal operation of headend 110. Thus, if, for example, sniffer 128 fails to operate, or if it is turned off, data communications between headend 110 and set-top terminals 158 necessary to carry out the normal operation continue, despite the inoperative state of sniffer 128.

The foregoing merely illustrates the principles of the invention. It will thus be appreciated that those skilled in the art will be able to devise numerous other arrangements which embody the principles of the invention and are thus within its spirit and scope.

For example, system 100 is disclosed herein in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed processors.

What is claimed is:

1. A communications system, comprising:
a first server for providing programming content;
a device for providing at least one data stream containing the programming content over a communications network to terminals coupled to the network, the at least one data stream being identified by a respective identifier;
a controller for communicating the respective identifier to requesting terminals for receiving the respective data streams; and
a second server for receiving from the terminals over the communications network viewer entered commands relating to a presentation of the programming content currently being provided to the respective terminals, and to:
read the commands received from respective terminals;
compile data from at least certain of the read commands, in association with identifications of the respective terminals providing the respective commands and time information relating to the respective commands;
store the compiled data;
forward the read commands to the first server for presentation of the programming content currently being provided to the respective terminals, in accordance with the read commands; and
total a number of terminals issuing a selected command with respect to selected programming content during a selected time period;
wherein the first server receives the commands forwarded by the second server and presents the programming content currently being provided to the respective terminals in accordance with the respective forwarded commands.

2. The communications system of claim 1, wherein for each command, the data includes a corresponding terminal identifier.

3. The communications system of claim 2, wherein the terminal identifier relates to a location of the corresponding terminal.

4. The communications system of claim 1, wherein the data includes information relating to a type of command received by the first server.

5. The communications system of claim 4, wherein the type of command received by the first server is a selected one of request, select, fast-forward, rewind, pause, play and stop command types.

6. The communications system of claim 1, wherein the data includes an asset identifier for identifying the programming content to which the commands relate.

7. The communications system of claim 1, wherein the time information comprises current time information for identifying a time a command is received by the first server.

8. The communications system of claim 7, wherein the current time information indicates a date.

9. The communications system of claim 1, wherein the time information comprises lapsed play time information for identifying a point within the programming content when a command is received.

10. A method for collecting data in a communications system including a first server and a second server, the method comprising:
provproviding by a first server programming content;
providing at least one data stream containing the programming content over a communications network to terminals coupled to the network, the at least one data stream being identified by a respective identifier;
communicating the respective identifier to requesting terminals for obtaining the programming content in the respective data streams;
receiving by a second server from respective terminals viewer entered commands relating to a presentation of the programming content currently being provided to the respective terminals;
compiling data from at least certain of the received commands by the second server in association with identifications of the respective terminals providing the respective commands and time information relating to the respective commands;
forwarding the received viewer entered commands by the second server to the first server to present the programming content currently being provided to the respective terminals, in accordance with the forwarded commands;
storing the compiled data for the plurality of terminals, by the second server; and
totaling a number of terminals issuing a selected command with respect to a selected programming content during a selected time period, by the second server.

11. The method of claim 10, wherein, for each command the data includes a corresponding terminal identifier.

12. The method of claim 11, wherein the terminal identifier relates to a location of the corresponding terminal.

13. The method of claim 10, wherein the data includes information relating to a type of command received by the first server.

14. The method of claim 13, wherein the type of command received by the first server is a selected one of request, select, fast-forward, rewind, pause, play and stop command types.

15. The method of claim 10, wherein the data includes an asset identifier for identifying the programming content to which the commands relate.

16. The method of claim 10, wherein the time information comprises current time information for identifying a time a command is received by the first server.

17. The method of claim 16, wherein the current time information indicates a date.

18. The method of claim 10, wherein the time information comprises lapsed play time information for identifying a point within the programming content when the command is received.

19. The method of claim 10, further comprising storing the compiled data in storage.

20. A communications system, comprising:
a server for providing programming content;
a device for providing at least one data stream containing the programming content over a communications network, the data stream being identified by an identifier;
a controller for communicating the identifier to requesting terminals for receiving the data stream;
a router for routing to the server viewer entered commands received from respective terminals over the communications network to cause presentation of programming content currently being provided to respective terminals in accordance with the viewer entered commands; and
a processing unit for reading at least a subset of the commands from the router while the commands are being routed through the router to the server to present programming content in accordance with the viewer entered commands, for compiling data from the read commands in association with an identification of the respective terminals providing the respective commands and time information relating to the respective commands, and for totaling a number of terminals issuing a selected command with respect to a selected program during a selected time period.

21. The communications system of claim 20, wherein for each command the data includes a corresponding terminal identifier.

22. The communications system of claim 21, wherein the terminal identifier relates to a location of the corresponding terminal.

23. The communications system of claim 20, wherein the data includes information relating to a type of command received by the router.

24. The communications system of claim 23, wherein the type of command received by the router is a selected one of request, select, fast-forward, rewind, pause, play and stop command types.

25. The communications system of claim 20, wherein the data includes an asset identifier for identifying the programming content to which the commands relate.

26. The communications system of claim 20, wherein the time information comprises current time information for identifying a time a command is received.

27. The communications system of claim 26, wherein the current time information indicates a date.

28. The communications system of claim 20, wherein the data includes lapsed play time information for identifying a point within the programming content when the command is received.

29. The communications system of claim 20, wherein the processing unit is further configured for storing the compiled data.

30. A method for collecting data in a communications system including a server, a router and a processing unit, the method comprising:
providing programming content by the server;
providing at least one data stream containing the programming content over the communications network to terminals coupled to the network, the at least one data stream being identified by an identifier;
communicating the identifier to requesting terminals for receiving the data stream;
routing by a router to the server viewer entered commands received from the terminals over the communications network, to cause presentation of programming content currently being provided to the respective terminals in accordance with the viewer entered commands;
allowing at least a subset of the commands to be read by the processing unit while the commands are being routed through the router;
compiling data concerning at least certain of the read commands in association with an identification of the respective terminals providing the respective commands and time information related to the respective command;
storing the compiled data for the plurality of terminals; and
totaling a number of terminals issuing a selected command with respect to a selected programming content during a selected time period.

31. The method of claim 30, wherein for each command the data includes a corresponding terminal identifier.

32. The method of claim 31, wherein the terminal identifier relates to a location of the corresponding terminal.

33. The method of claim 30, wherein the data includes information relating to a type of command received by the router.

34. The method of claim 33, wherein the type of command received by the router is a selected one of request, select, fast-forward, rewind, pause, play and stop command types.

35. The method of claim 30, wherein the data includes an asset identifier for identifying the programming content to which the commands relate.

36. The method of claim 30, wherein the time information comprises current time information for identifying a time a command is read by the processing unit.

37. The method of claim 36, wherein the current time information indicates a date.

38. The method of claim 30, wherein the time information comprises lapsed play time information for identifying a point within the programming content when the command is received.

39. The method of claim 30, further comprising storing the compiled data in storage.

40. The communications system of claim 1, wherein the second server is further configured to:
store the compiled data in a database.

41. The communications network of claim 40, wherein:
the data concerning each command comprises one or more items of information chosen from the group consisting of: information indicating a type of command, and information indicating programming content to which the command pertains.

42. The communications system of claim 41, wherein the second server is configured to:
generate user activity information based at least in part on the total number of terminals issuing the selected command with respect to the selected programming content during the selected time period.

43. The communications system of claim 42, wherein the second server is configured to:
total a number of times a selected item of programming content has been accessed for display.

44. The communications system of claim 43, wherein the second server is configured to:
determine a number of times the selected item of programming content has been displayed in its entirety.

45. The communications system of claim 43, wherein the second server is configured to:
determine a number of times the selected item of programming content has been displayed only partially.

46. The communications system of claim 42, wherein the selected item of programming content comprises one or more items chosen from a group consisting of: a commercial, a television broadcast program, a music video, a news program, a weather report, a traffic report, a sports program, a video-on-demand program, and an audio-on-demand program.

47. The communications system of claim 42, wherein at least some of the commands comprise fast-forward commands, the second server being configured to:
determine a number of fast-forward commands received with respect to a selected item of programming content.

48. The communications system of claim 42, wherein the second server is configured to:
total a number of terminals that have accessed a selected item of programming content.

49. The communications system of claim 42, wherein the second server is configured to:
determine whether the selected item of programming content has been accessed during a selected period of time.

50. The communications system of claim 42, wherein the second server is configured to:
determine at least one measure of popularity of one or more selected items of programming content based, at least in part, on the compiled data.

51. The communications system of claim 42, wherein the second server is configured to:
identify one or more most popular times when a selected item of programming content has been accessed based, at least in part, on the compiled data.

52. The communications system of claims 1, wherein the programming content is non-targeted by the first server.

53. A communications system, comprising:
a database;
at least one processor configured to:
provide programming content;
provide at least one data stream containing programming content over a communications network, the at least one data stream being identified by a respective identifier;
communicate the identifier to at least one of the terminals for receiving the data stream;
receive from the terminals over the communications network viewer entered commands relating to a presentation of the programming content;
present the programming content to respective terminals in accordance with the respective commands;
compile data concerning the commands received from the plurality of terminals;
store the compiled data in the database;
total a number of terminals selecting particular programming content during a selected time period based, at least in part, on the stored data;
determine a number of terminals displaying the selected program content in its entirety, based, at least in part, on the stored data;
determine a number of terminals displaying the selected program content only partially, based, at least in part, on the stored data; and
for the terminals partially viewing the selected program content, determine a percentage of time that each partially viewed program content was viewed, based, at least in part, on the stored data;
the system further comprising at least one interface coupled to a network and to the at least one processor, wherein the at least one processor provides the programming content to terminals via the at least one interface and the network, and the at least one processor receives the viewer entered commands via the at least one interface and the network.

54. The system of claim 53, wherein the at least one processor is further configured to determine fees owed for transmission of the particular programming content in the selected time period based, at least in part, on the number of terminals in the selected time period displaying the particular programming content, the number of terminals displaying the selected program content in its entirety, the number of terminals displaying the selected program content only partially, and the percentage of time that each partially viewed selected programming was viewed.

55. The system of claim 54, wherein the selected program content comprises an advertisement.

56. The system of claim 55, wherein the selected command is selection of the advertisement.

57. The system of claim 56, wherein a second selected command is fast forwarding of the advertisement.

58. The system of claim 53, wherein the at least one processor comprises:
- a first server configured to present the programming content; and
- a second server configured to receive from the terminals the viewer entered commands, compile the data, and forward the commands to the first server.

59. The system of claim 53, wherein the at least one processor comprises:
- a first server configured to present the programming content;
- a router configured to rout the viewer entered commands to the first server; and
- a processing unit configured to read at least a subset of the commands and compile the data concerning the received commands.

* * * * *